(12) United States Patent
Husson et al.

(10) Patent No.: US 8,864,156 B2
(45) Date of Patent: Oct. 21, 2014

(54) VEHICLE AXLE MOUNTING ARRANGEMENT

(75) Inventors: Geoffroy Husson, Beauvais (FR); Frederic Ducroquet, Orville (FR)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/510,183

(22) PCT Filed: Nov. 12, 2010

(86) PCT No.: PCT/EP2010/067407
§ 371 (c)(1),
(2), (4) Date: Jul. 31, 2012

(87) PCT Pub. No.: WO2011/058146
PCT Pub. Date: May 19, 2011

(65) Prior Publication Data
US 2012/0298431 A1    Nov. 29, 2012

(30) Foreign Application Priority Data
Nov. 16, 2009   (GB) .................................. 0919978.7

(51) Int. Cl.
*B60G 9/02*           (2006.01)

(52) U.S. Cl.
CPC .............. *B60G 9/02* (2013.01); *B60G 2206/31* (2013.01); *B60G 2200/34* (2013.01); *B60G 2300/08* (2013.01); *B60G 2200/314* (2013.01); *B60G 2300/07* (2013.01); *B60G 2200/32* (2013.01); *B60G 2300/09* (2013.01); *B60G 2204/148* (2013.01); *B60G 2206/605* (2013.01); *B60G 2206/121* (2013.01)
USPC ........ 280/124.117; 280/124.106; 280/124.11; 280/124.111

(58) Field of Classification Search
USPC .................... 280/124.106, 124.107, 124.128, 280/124.112, 124.117, 124.111, 124.11
See application file for complete search history.

(56) References Cited

U.S. PATENT DOCUMENTS 3,245,492 A * 4/1966 Herr ............................... 180/360
3,858,901 A * 1/1975 Johnson ................. 280/124.138
(Continued)

FOREIGN PATENT DOCUMENTS

DE          4129715 A1     3/1993
EP          0512550 A2    11/1992
(Continued)

OTHER PUBLICATIONS

International Search Report for International Application No. PCT/EP2010/067407 Dated Feb. 1, 2011.
(Continued)

*Primary Examiner* — James English

(57) ABSTRACT

A vehicle has a chassis (11) with front and rear axles (12, 13) suspended from the chassis for vertical and roll movement relative to the chassis. The axles are each mounted on the chassis via an upper pivotal mounting means in the form of an upper pair of arms (12a, 13a) which is pivoted on the chassis for vertical pivoting movement relative thereto and which carry an axle support (15, 16) on which the axle (12, 13) is free to pivot in the roll mode. A second lower pair of pivoting arms (12b, 13b) also connect each axle (12, 13) to the chassis to control fore and aft movement of the axle relative to the chassis. The line of action of the forces (F1-F4) applied to the chassis (11) by the upper arms (12a, 13a) at one end of the chassis are be substantially aligned with the line of action of the forces applied to the chassis by the lower arms (12b, 13b) at the other end of the chassis to reduce and tendency for the chassis to be twisted by these forces. A first damping means (19) acts between the chassis (11) and the upper pivotal mounting means (12a, 13a) to control vertical movement of the axle relative to the chassis, and a second damping means acts between the upper pivotal mounting means (12a, 13 a) and the axle (12,13) to provide independent control of the roll movement of the axle relative to the chassis.

20 Claims, 9 Drawing Sheets

(56) References Cited

U.S. PATENT DOCUMENTS

| | | | |
|---|---|---|---|
| 4,418,932 A | | 12/1983 | Claar |
| 4,484,767 A | * | 11/1984 | Klem ................... 280/124.107 |
| 4,603,881 A | * | 8/1986 | Mikina ................. 280/124.107 |
| 4,738,466 A | * | 4/1988 | Mikina ................. 280/124.107 |
| 5,094,473 A | * | 3/1992 | Kawabe et al. ........ 280/124.104 |
| 5,351,985 A | * | 10/1994 | Ando et al. ................ 280/5.52 |
| 7,926,846 B2 | * | 4/2011 | Tanaka et al. ................ 280/781 |
| 8,025,313 B2 | * | 9/2011 | Tanaka et al. ................ 280/781 |
| 2002/0109325 A1 | | 8/2002 | Purick |
| 2008/0231012 A1 | | 9/2008 | Rach et al. |
| 2009/0127812 A1 | * | 5/2009 | Copsey et al. ......... 280/124.128 |
| 2012/0285754 A1 | * | 11/2012 | Husson et al. ................ 180/60 |

FOREIGN PATENT DOCUMENTS

| | | |
|---|---|---|
| EP | 0754576 A1 | 1/1997 |
| EP | 1123894 A2 | 8/2001 |
| EP | 1226985 A1 | 7/2002 |
| EP | 1518720 A1 | 9/2003 |
| EP | 1985474 A2 | 4/2008 |

OTHER PUBLICATIONS

UK Search Report for UK Application No. 0919978.7 Dated Feb. 18, 2010.

* cited by examiner

US 8,864,156 B2

VEHICLE AXLE MOUNTING ARRANGEMENT

BACKGROUND OF THE INVENTION

1. Field of Invention

This invention relates to a vehicle axle mounting arrangement and in particular to such an arrangement which is suitable for use in an agricultural tractor or similar vehicle.

2. Description of Related Art

Conventionally agricultural tractors have a suspended front axle and a rigid rear axle which forms part of the rigid chassis of the tractor.

There is a requirement to provide a tractor chassis in which both front and rear axles are suspended. Such axle mounting arrangements can cause problems due to the effects of the loading imposed on the remainder of the chassis by the axles.

SUMMARY OF THE INVENTION

It is an object of the present invention to provide a vehicle such as an agricultural tractor with front and rear suspended axles and which reduces the effects on the chassis of the forces applied to the remainder of the chassis by the suspended axles.

Thus according to the present invention there is provided a vehicle having a chassis on which front and rear axles are respectively mounted by an upper pivotal mounting means which is pivoted on the chassis for vertical pivoting movement relative to the chassis and which carries an axle support on which the axle is free to pivot in a roll mode, each axle also being mounted from the chassis by a second lower pivotal mounting means which is pivoted on the chassis for vertical pivoting movement relative thereto and which acts on the axle to control fore and aft movement of the axle relative to the chassis, the two pivotal mounting means being mounted on the chassis so that the line of action of the forces applied to the chassis by the upper pivotal mounting means at one end of the chassis is substantially aligned with line of action of the forces applied the chassis by the lower pivotal mounting means at the other end the chassis thus reducing the tendency for the chassis to be twisted by the forces applied thereto by the axles.

Such an axle mounting arrangement significantly reduces the effects of the loads applied to the chassis by the axle mounting.

The vehicle may be provided with first damping means acting between the chassis and the upper pivotal mounting means to control vertical movement of each axle relative to the chassis, and a second damping means acting between the first pivotal mounting means and the axle to provide independent control of the roll movement of the axle relative to the chassis.

The first pivotal mounting means may comprise an upper pair of arms pivoted at their inner ends on the chassis and carrying the axle support at their outer ends A second lower pair of arms may be provided which are pivoted at their inner ends on the chassis for vertical pivoting movement relative thereto and act at their outer ends on the axle to control fore and aft movement of the axle relative to the chassis.

In such an arrangement the upper pair of arms may have a first pair of downwardly extending brackets to which one end of the first damping means is secured and a second pair of upwardly extending brackets from which one end of the second damping means is secured.

The damping means may comprise hydraulic or pneumatic cylinders or spring units. These hydraulic or pneumatic cylinders or spring units may be connected with a fluid pressure control system which provides on the go active damping of the or each axle.

The chassis may have a central region end raised front and rear and regions beneath which the respective axles are mounted, the first damping means acting between a given upper pair of axle mounting arms and the adjacent raised end portion of the chassis.

Such a chassis configuration is particularly suitable for use with electric propulsion when each axle is provided with an electric drive motor located beneath the respective raised end portion of the chassis, a power source for each motor being housed in the central region of the chassis.

In such an arrangement the power source may comprise a fuel cell and/or batteries or an electrical generator driven by an internal combustion engine charging batteries.

In accordance with a further aspect of the present invention there is provided a vehicle having a chassis with a central region and raised front and rear end regions beneath which front and rear axles are mounted, damping means actuating between the raised end portion of the chassis and the axles to control pivoting of the axles relative to the raised portions, and electric dive motor located beneath each raised end portion to drive the adjacent axle, and a power source for each motor being housed in the central region of the chassis.

In all the above vehicle configurations one or both axles may be steerable.

Also at least one axle may have a central vertically extending housing on which an upper implement attachment link mounted point is provided, lower implement attachment link mounting points being provided on either side of the centre of the axle. This central vertically extending housing may support a PTO drive shaft and may contain a drive train for the PTO shaft.

BRIEF DESCRIPTION OF THE DRAWINGS

The various aspects of the present invention will now be described with reference to the accompanying drawings in which:—

DETAILED DESCRIPTION OF THE INVENTION

Figure 1:
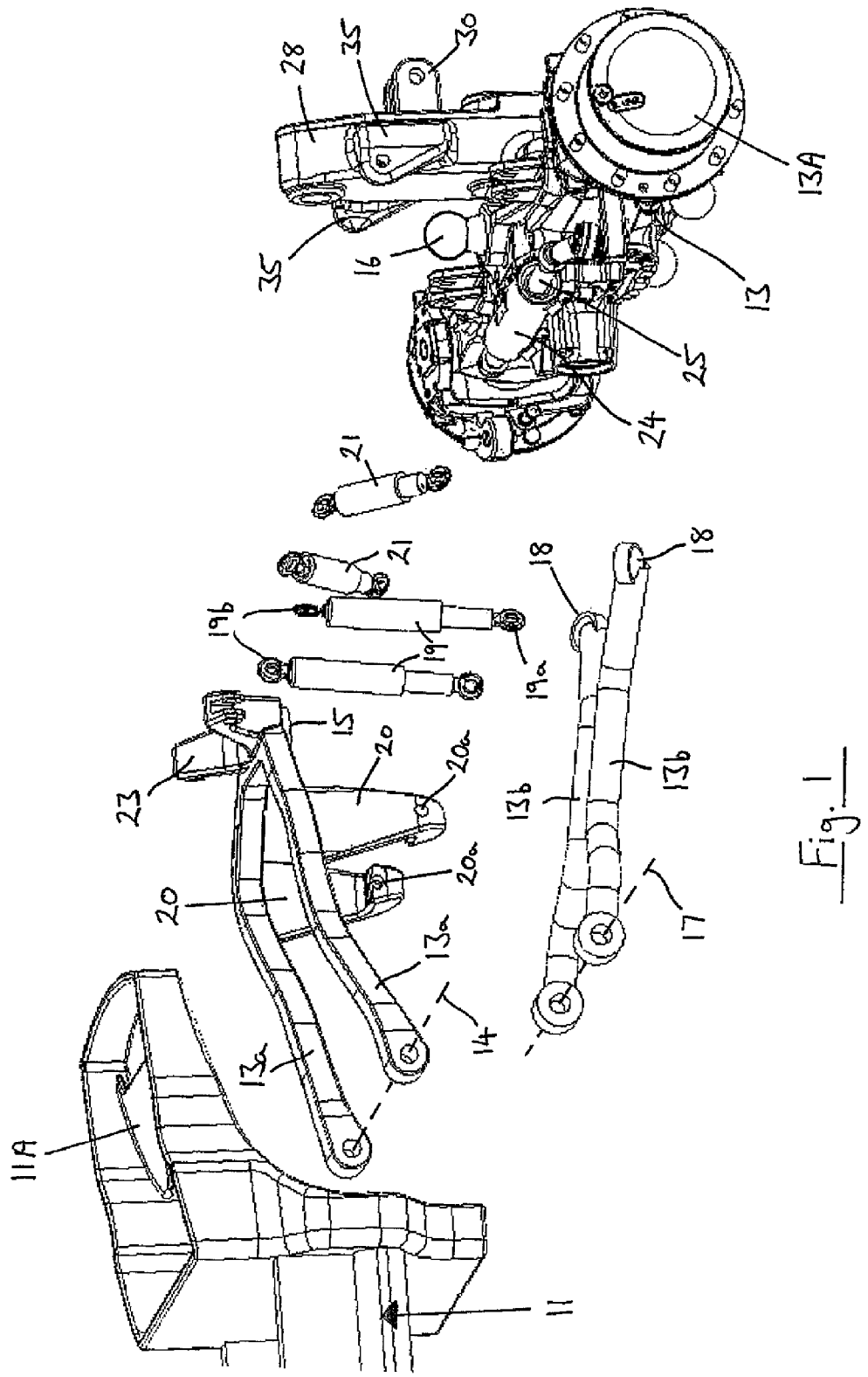
FIG. 1 shows a perspective exploded view of one end of a vehicle with an axle mounting arrangement in accordance with the present invention.

Referring to the drawings, a vehicle in the form of an agricultural tractor 10 has a chassis 11 on which a front axle 12 and rear axle 13 are pivotally mounted by upper pairs of arms 12*a* and 13*a* and lower pairs of arms 12*b* and 13*b*. The front upper and lower arms 12*a* and 12*b* at the front of the tractor are essentially identical to the rear upper and lower arms 13*a* and 13*b* at the rear of the tractor.

As can be seen from FIG. 1, the rear upper arms 13a are mounted on the chassis 11 for pivoting about and axis 14. The arms are joined at their outer ends to form a single generally U-shaped unit. Adjacent the outer ends of the arms 13a is provided a ball joint socket 15 which receives a ball joint 16 mounted on the axle 13.

The lower pair of arms 13b are mounted for pivoting relative to the axle 11 about and axis 17 and their outer ends have ball joint connectors 18 which connect the lower arms 13b with the axle 13.

Vertical pivoting movement of the upper arms 13a relative to rear raised portion 11A of the chassis 11 is controlled by a pair of hydraulic dampers 19 which are connected at their lower ends 19a to lower portions 20a of a pair of downwardly extending brackets 20 mounted on arms 13a. The upper ends 19b of dampers 19 are connected with raised chassis portion 11A. Thus the dampers 19, which may be simple dampers with predetermined damping characteristics or may be connected with a hydraulic suspension control system, are designed to control the vertical movement of the axle 13 relative to the chassis 11.

Roll movement of the axle 13 relative to the arms 13a is controlled by a second pair of hydraulic dampers 21 which are connected at their lower ends with brackets 22 provided on the axle 13 and at the upper ends with upwardly extending brackets 23 mounted on the outer ends of upper arms 13a. As will be appreciated, the dampers 21 may be again isolated with a predetermined damping characteristic or can be connected to a suspension control system so that their damping can be varied.

As is evident from above, the vertical movements of axle 13 are therefore controlled by dampers 19 and the roll of the axle 13 is separately controlled by independent dampers 21 thus allowing the vertical and roll movements of the axle to be individually and more accurately controlled.

The above arm and damper arrangement described in relation to the rear axle 13 is repeated in relation to the front axle 12 and thus in the accompanying drawings similar components to those used on the front axle have been numbered similarly to the above described rear axle components.

Figure 9:
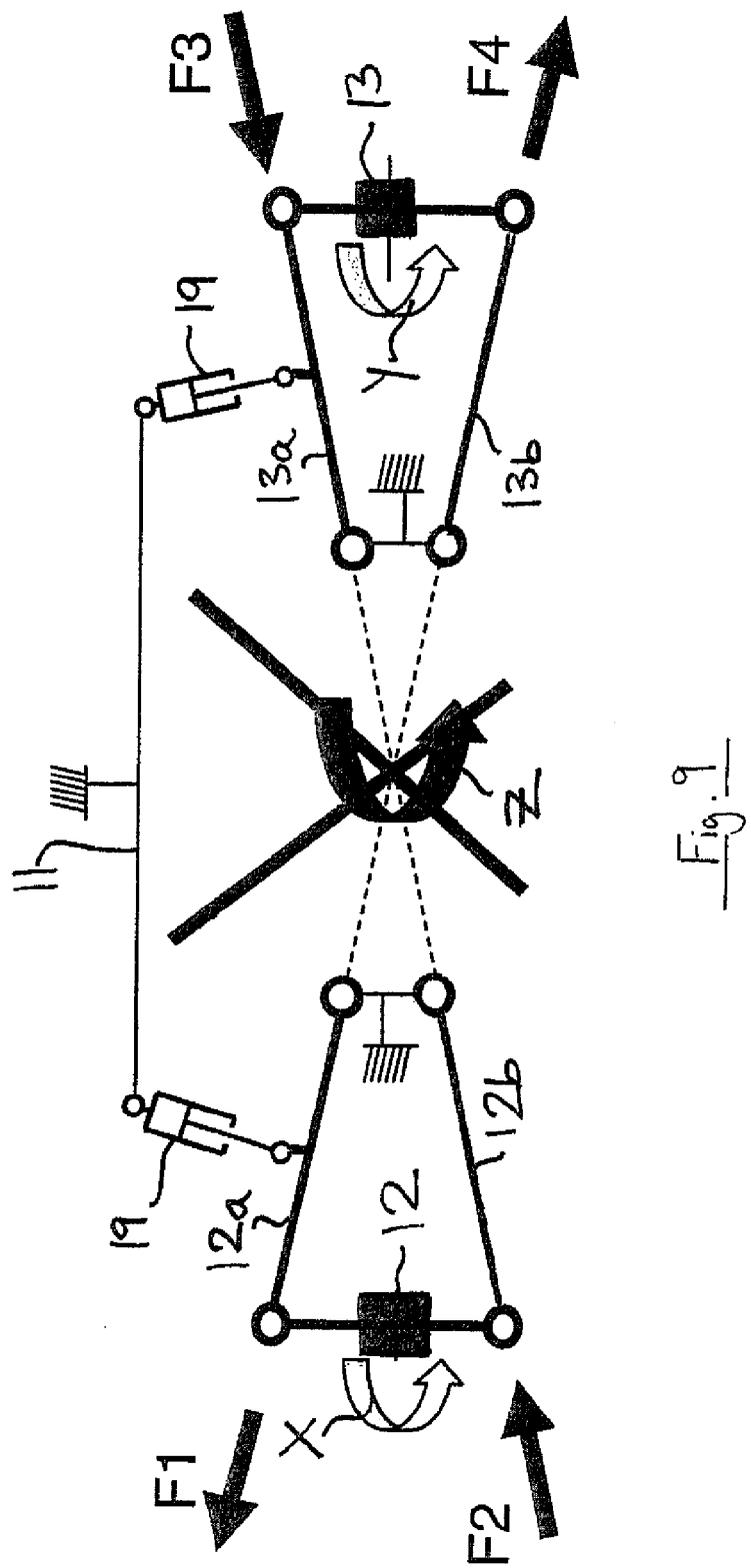
FIG. 9 shows diagrammatically the line of action of the forces applied to the chassis by the axles.

In accordance with the present invention, and as best illustrated diagrammatically in FIG. 9, the line of action of the forces applied to the chassis 11 by the upper arms 12a,13a at one end of the chassis are substantially aligned with the line of action with the forces applied to the chassis by the lower arms 12b,13b at the other end of the chassis. This reduces the tendency of the chassis to be twisted by the forces applied thereto by the axles.

For example, the front axle 12 tends to rotate anti-clockwise relative to the chassis 11 as indicated by the arrow X in FIG. 9 when the tractor is being driven in the forward direction. This applies a tensile loading to the front upper arms 12a as indicated by the force F1 in FIG. 9 and a compressive loading to the lower front arms 12b as indicated by the force F2. In a similar manner the rear axle 13 also tends to rotate anti-clockwise relative to the chassis 11, as indicated by arrow Y in FIG. 9, so that the upper links 13a are subject to a compressive load indicated by the force F3 and the lower rear links 13b are subject to a tensile load as indicated by the force F4. Because the line of action forces F1 and F4 are aligned an opposite to each other and similarly the forces F2 and F3 are also aligned and opposite to each other any tendency for the whole chassis to be twisted in a counter clockwise sense, as indicated by the crossed-out arrow Z, is significantly reduced.

In the chassis arrangement shown in the accompanying drawings both axles 12 and 13 are provided with hydraulic steering cylinders 24 which are connected with steerable wheels hubs 12A and 13A respectively by steering rods 25. This gives a four wheel steering capability which increases the manoeuvrability of the vehicle. If desired, for example, only the front axle 12 need be provided with a steering capability.

Figure 2:
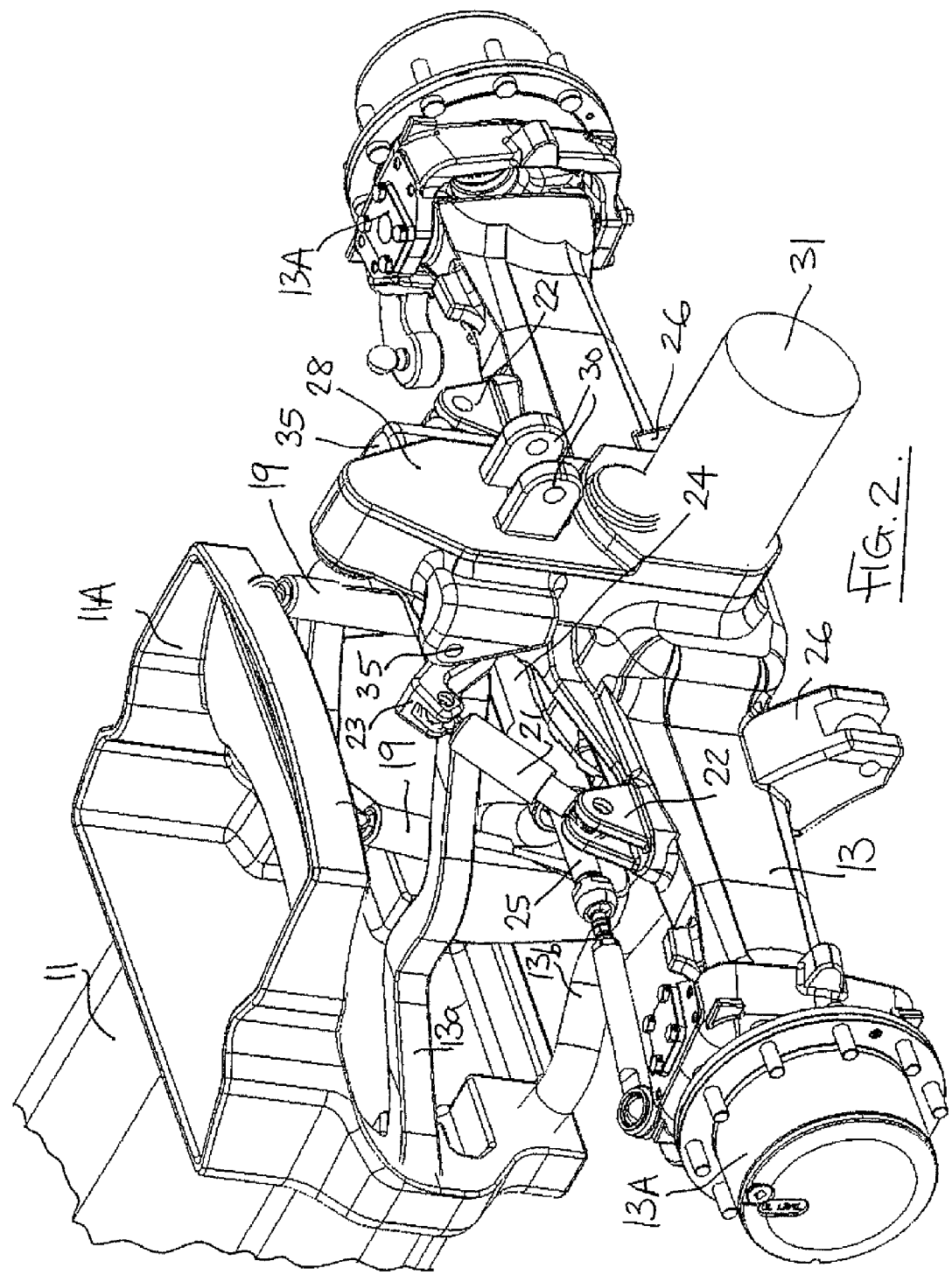
FIGS. 2, 3 and 4 show assembled perspective views of the axle mounting arrangement shown in FIG. 1.
Figure 3:
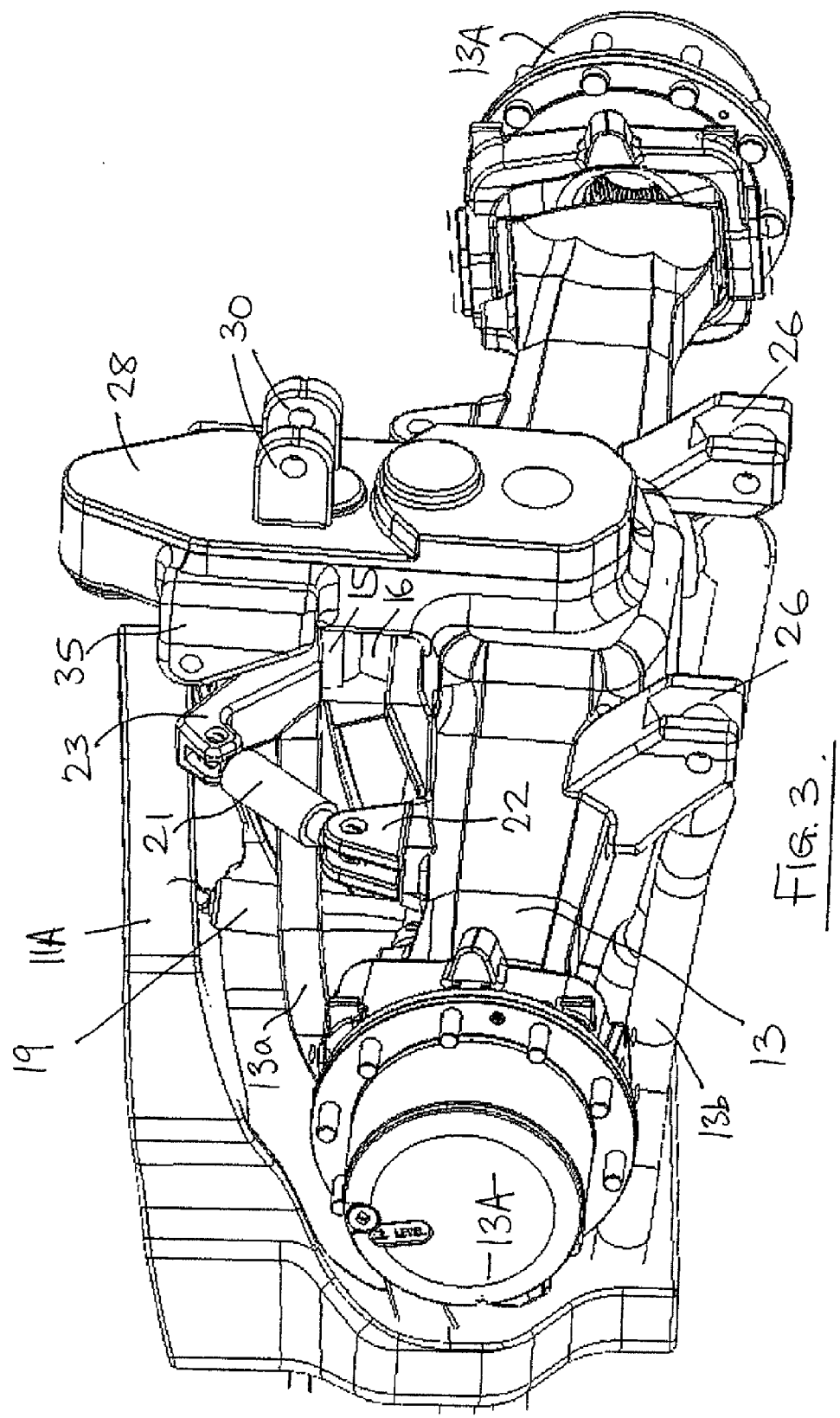
Figure 4:
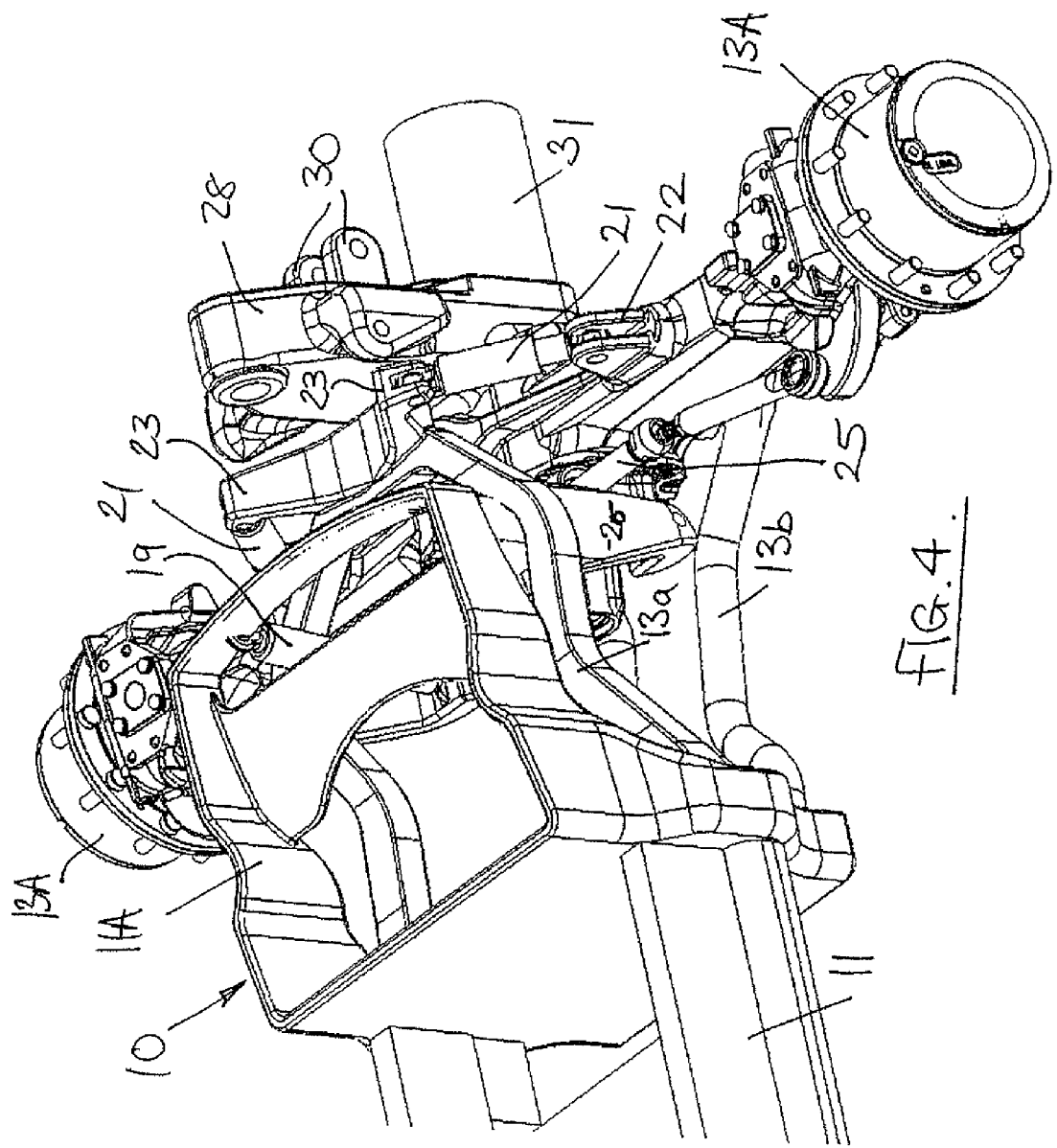
Figure 5:
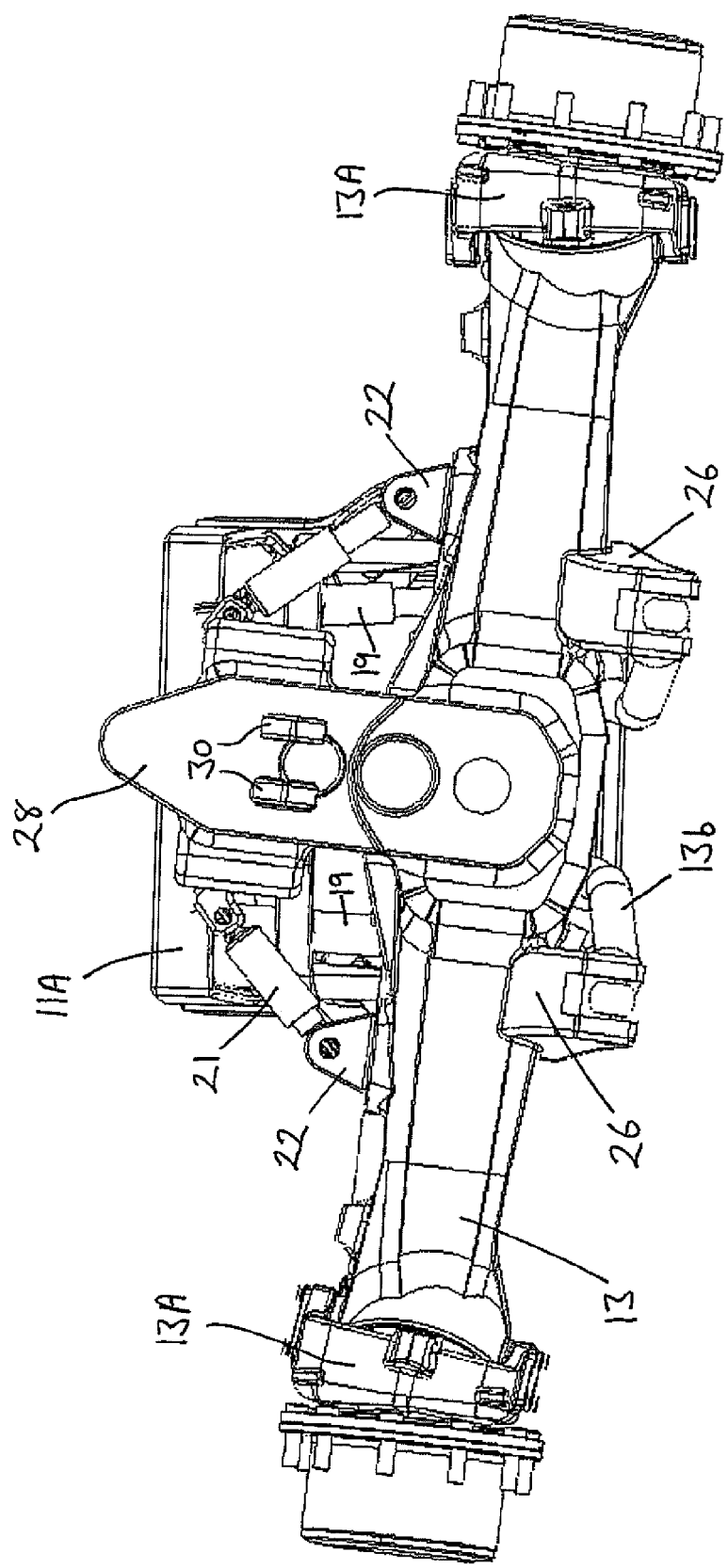
FIG. 5 shows one end view of the axle mounting arrangement of FIGS. 1 to 3.
Figure 6:
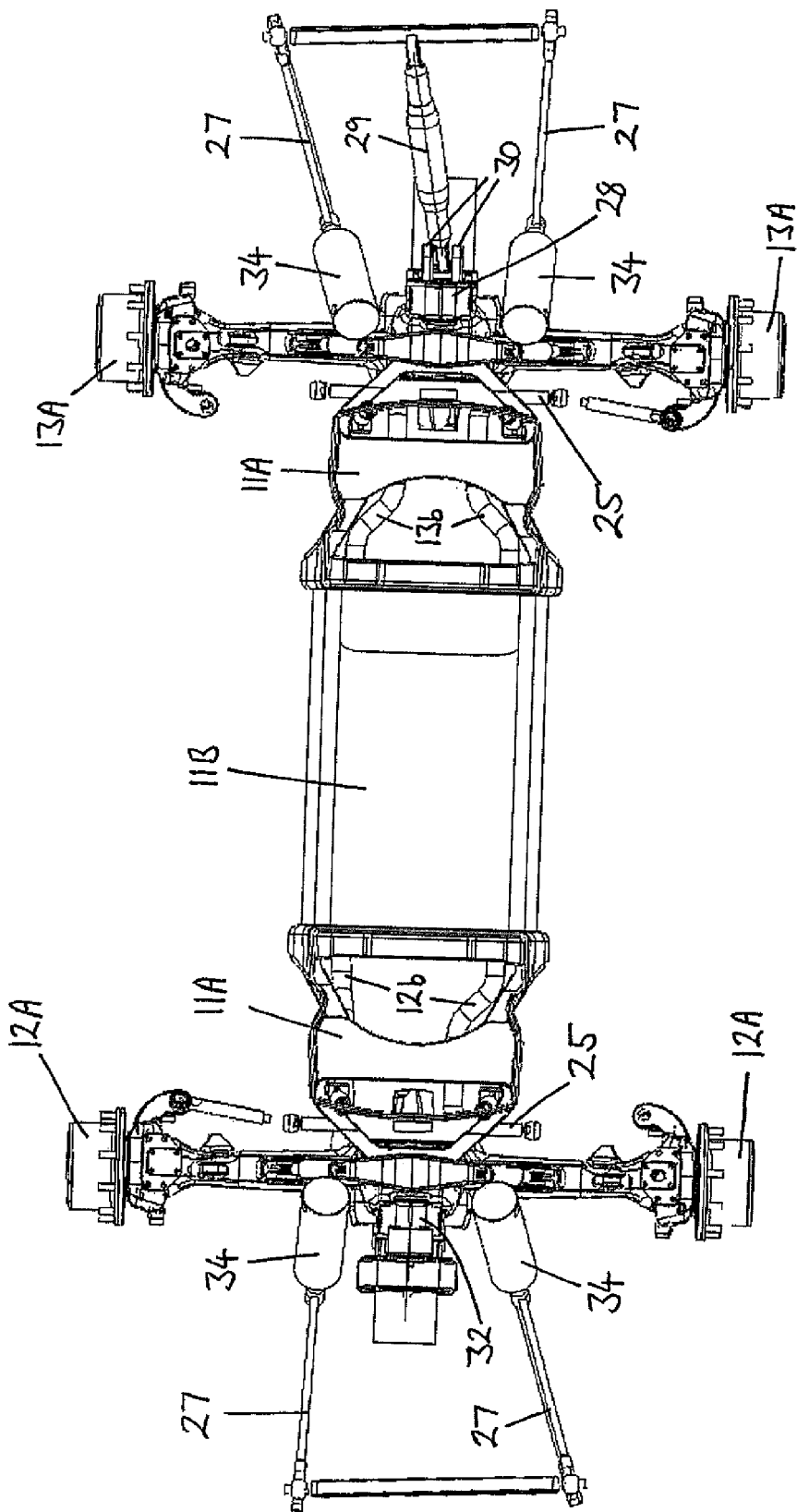
FIGS. 6 and 7 show plan and side views respectively of a vehicle provided with axle mounting arrangements in accordance with the present invention at the front and rear of the vehicle.
Figure 7:
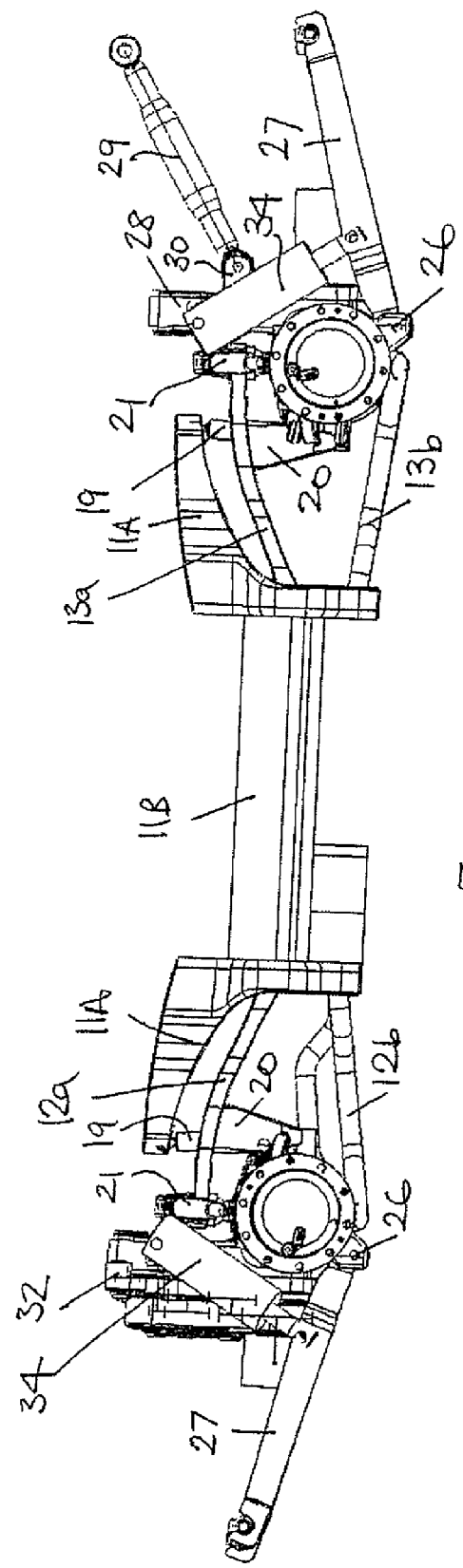
Figure 8:
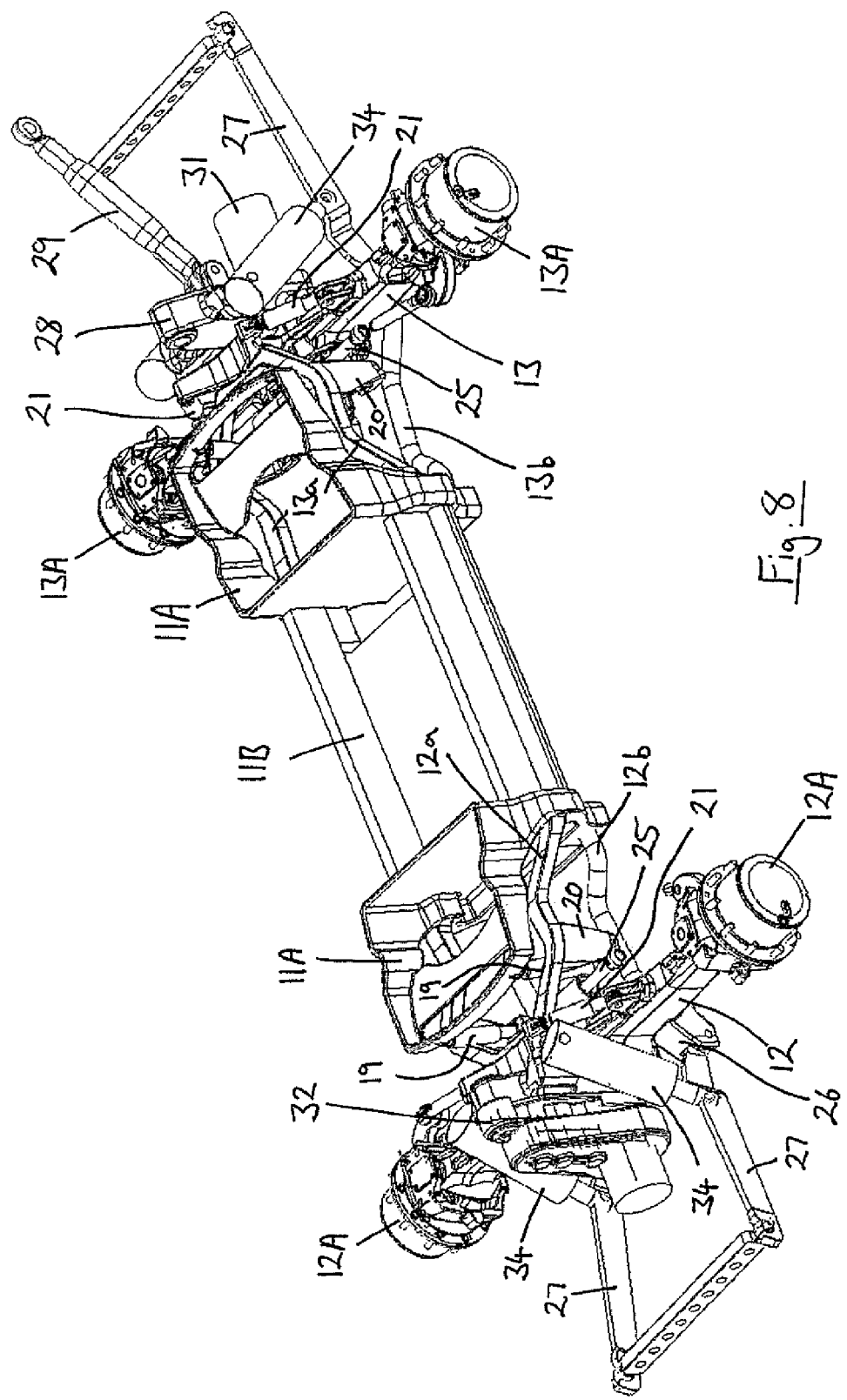
FIG. 8 shows a perspective view of the vehicle of FIGS. 6 and 7.

Both the front and rear axles 12 and 13 are provided with brackets 26 on which lower implement mounting links 27 may be pivotally mounted in the normal manner. As can be seen from FIG. 2, the rear axle 13 is provided with a vertically extending housing 28 on which an upper implement mounting link 29 may be mounted via a bracket 30. The vertically housing 28 may also include a drive train for a PTO shaft 31 which projects rearwardly from axle 13.

A similar vertically extending housing 32 may be provided on front axle 12 from which a front PTO 33 may extend and a further upper implement mounting link (not shown) may be mounted.

The front and rear implement mounting links 27 may be moved vertically relative to the chassis 11 by lift cylinders 34 which act between the links 27 and ears 35 and 36 provided on the vertically extending housings 28 and 32 respectively.

The tractor may be powered by conventional internal combustion engine which could be housed in a central lower portion 11B of the chassis with drive shafts extending forwards and rearwards to the front and rear axles respectively. Alternatively, the chassis arrangement described above is particularly suitable for the use of electric motor propulsion in which, for example, a first electric motor 40 may be provided beneath the rear upper chassis portion 11A and a front electric motor 41 may be provided below the front upper chassis portion 11A. These motors may be powered from a battery installation located in the central lower chassis portion 11B. Other well known power sources may be provided for the motors 40 and 41. For example, a small internal combustion engine may drive a generator which charges the battery pack or a fuel cell may be used to generate electricity for powering the motors.

The invention claimed is:

1. A vehicle having a chassis on which front and rear axles are respectively mounted by an upper pivotal mounting means which is pivoted on the chassis for vertical pivoting movement relative to the chassis and which carries an axle support on which each axle is free to pivot in a roll mode, each axle also being mounted from the chassis by a lower pivotal mounting means which is pivoted on the chassis for vertical pivoting movement relative thereto and which acts on each axle to control fore and aft movement of each axle relative to the chassis, the two pivotal mounting means being mounted on the chassis so that the line of action of the forces applied to the chassis by the upper pivotal mounting means at one end of the chassis is substantially aligned with a line of action of the forces applied to the chassis by the lower pivotal mounting means at the other end the chassis thus reducing the tendency for the chassis to be twisted by the forces applied thereto by the axles.

2. A vehicle according to claim 1 in which the upper pivotal mounting means comprises an upper pair of arms pivoted at their inner ends on the chassis and carrying each axle support at their outer ends.

3. A vehicle according to claim 1 in which the lower pivotal mounting means comprises a lower pair of arms pivoted at their inner ends on the chassis for vertical pivoting movement relative thereto and act at their outer ends on each axle to control fore and aft movement of each axle relative to the chassis.

4. A vehicle according to claim 2 in which the upper pair of arms have a first pair of downwardly extending brackets to which one end of the first damping means is secured and a second pair of upwardly extending brackets from which one end of the second damping means is secured.

5. A vehicle according to claim 1 in which one or both axles are steerable.

6. A vehicle according to claim 1 in which at least one axle has a central vertically extending housing on which an upper implement attachment link mounted point is provided, lower implement attachment link mounting points being provided on either side of the centre of the at least one axle.

7. A vehicle according to claim 6 in which the central vertically extending housing supports a PTO drive shaft and contains a drive train for the PTO shaft.

8. A vehicle having a chassis on which front and rear axles are respectively mounted by an upper pivotal mounting means which is pivoted on the chassis for vertical pivoting movement relative to the chassis and which carries an axle support on which each axle is free to pivot in a roll mode, each axle also being mounted from the chassis by a lower pivotal mounting means which is pivoted on the chassis for vertical pivoting movement relative thereto and which acts on the axle to control fore and aft movement of the axle relative to the chassis, the two pivotal mounting means being mounted on the chassis so that the line of action of the forces applied to the chassis by the upper pivotal mounting means at one end of the chassis is substantially aligned with a line of action of the forces applied to the chassis by the lower pivotal mounting means at the other end the chassis thus reducing the tendency for the chassis to be twisted by the forces applied thereto by the axles, in which first damping means act between the chassis and the upper pivotal mounting means to control vertical movement of each axle relative to the chassis, and a second damping means act between the upper pivotal mounting means and each axle to provide independent control of the roll movement of each axle relative to the chassis.

9. A vehicle according to claim 8 in which the first and second damping means comprise hydraulic or pneumatic cylinders or spring units.

10. A vehicle according to claim 9 in which the hydraulic or pneumatic cylinders or spring units are connected with a fluid pressure control system which provides on the go active damping of each axle.

11. A vehicle according to claim 8 in which the chassis has a central region and raised front and rear end regions beneath which the respective axles are mounted, the first damping means acting between a given upper pair of axle mounting arms and the adjacent raised end portion of the chassis.

12. A vehicle according to claim 11 in which each axle is provided with an electric drive motor located beneath the respective raised end portion of the chassis, a power source for each motor being housed in the central region of the chassis.

13. A vehicle according to claim 12 in which the power source comprises a fuel cell and/or batteries or an electrical generator driven by an internal combustion engine charging batteries.

14. A vehicle according to claim 8 in which the upper pivotal mounting means comprises an upper pair of arms pivoted at their inner ends on the chassis and carrying the axle support at their outer ends.

15. A vehicle according to claim 8 in which the lower pivotal mounting means comprises a lower pair of arms pivoted at their inner ends on the chassis for vertical pivoting movement relative thereto and act at their outer ends on each axle to control fore and aft movement of each axle relative to the chassis.

16. A vehicle according to claim 14 in which the lower pivotal mounting means comprises a lower pair of arms pivoted at their inner ends on the chassis for vertical pivoting movement relative thereto and act at their outer ends on each axle to control fore and aft movement of each axle relative to the chassis.

17. A vehicle according to claim 14 in which the upper pair of arms have a first pair of downwardly extending brackets to which one end of the first damping means is secured and a second pair of upwardly extending brackets from which one end of the second damping means is secured.

18. A vehicle according to claim 8 in which the first and second damping means comprise hydraulic or pneumatic cylinders or spring units.

19. A vehicle according to claim 18 in which the hydraulic or pneumatic cylinders or spring units are connected with a fluid pressure control system which provides on the go active damping of the or each axle.

20. A vehicle having a chassis on which front and rear axles are respectively mounted by an upper pair of pivotal mounting arms which are pivoted on the chassis for vertical pivoting movement relative to the chassis and which carry an axle support on which each axle is free to pivot in a roll mode, each axle also being mounted from the chassis by a lower pair of pivotal mounting arms which are pivoted on the chassis for vertical pivoting movement relative thereto and which act on the axle to control fore and aft movement of the axle relative to the chassis, the two pairs of pivotal mounting arms being mounted on the chassis so that the line of action of the forces applied to the chassis by the upper pair of pivotal mounting arms at one end of the chassis is substantially aligned with a line of action of the forces applied to the chassis by the lower pair of pivotal mounting arms at the other end the chassis thus reducing the tendency for the chassis to be twisted by the forces applied thereto by the axles, in which a first damper acts between the chassis and the upper pair of pivotal mounting arms to control vertical movement of each axle relative to the chassis, and a second damper acts between the upper pair of pivotal mounting arms and each axle to provide independent control of the roll movement of each axle relative to the chassis.

* * * * *